Dec. 1, 1931.   G. FLINTERMANN   1,834,450
SHOCK ABSORBING DEVICE
Filed March 28, 1929   3 Sheets-Sheet 3
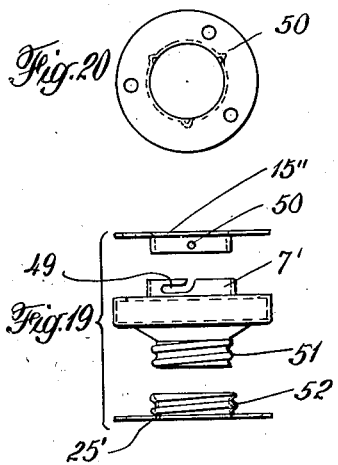
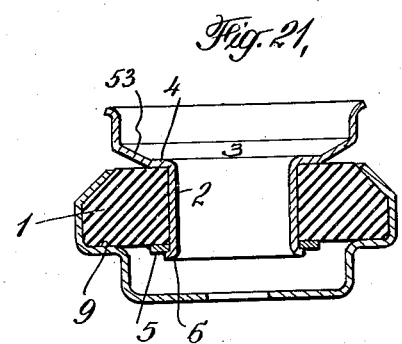
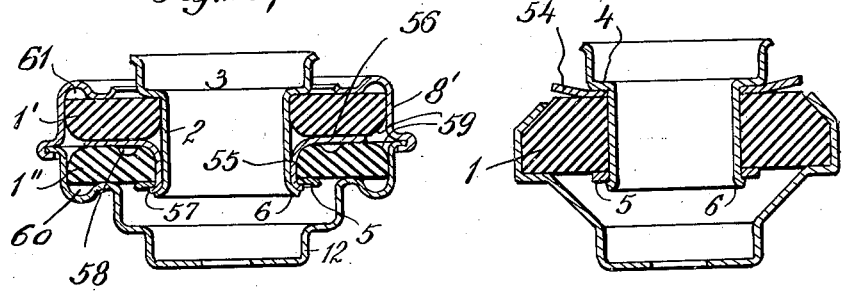
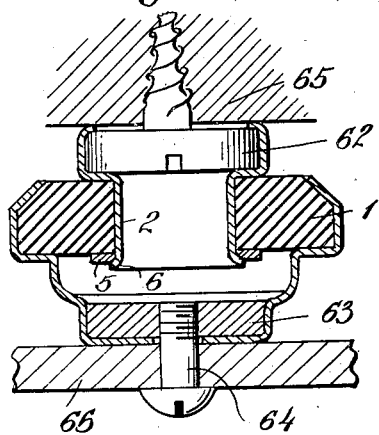
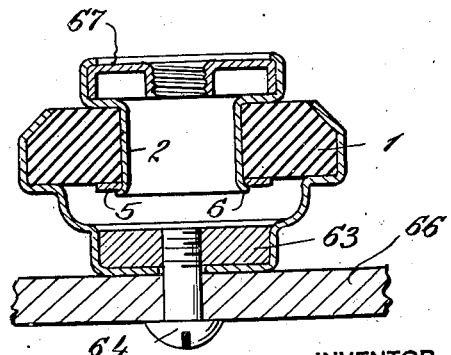
INVENTOR
Gerhard Flintermann
BY
ATTORNEYS Patented Dec. 1, 1931

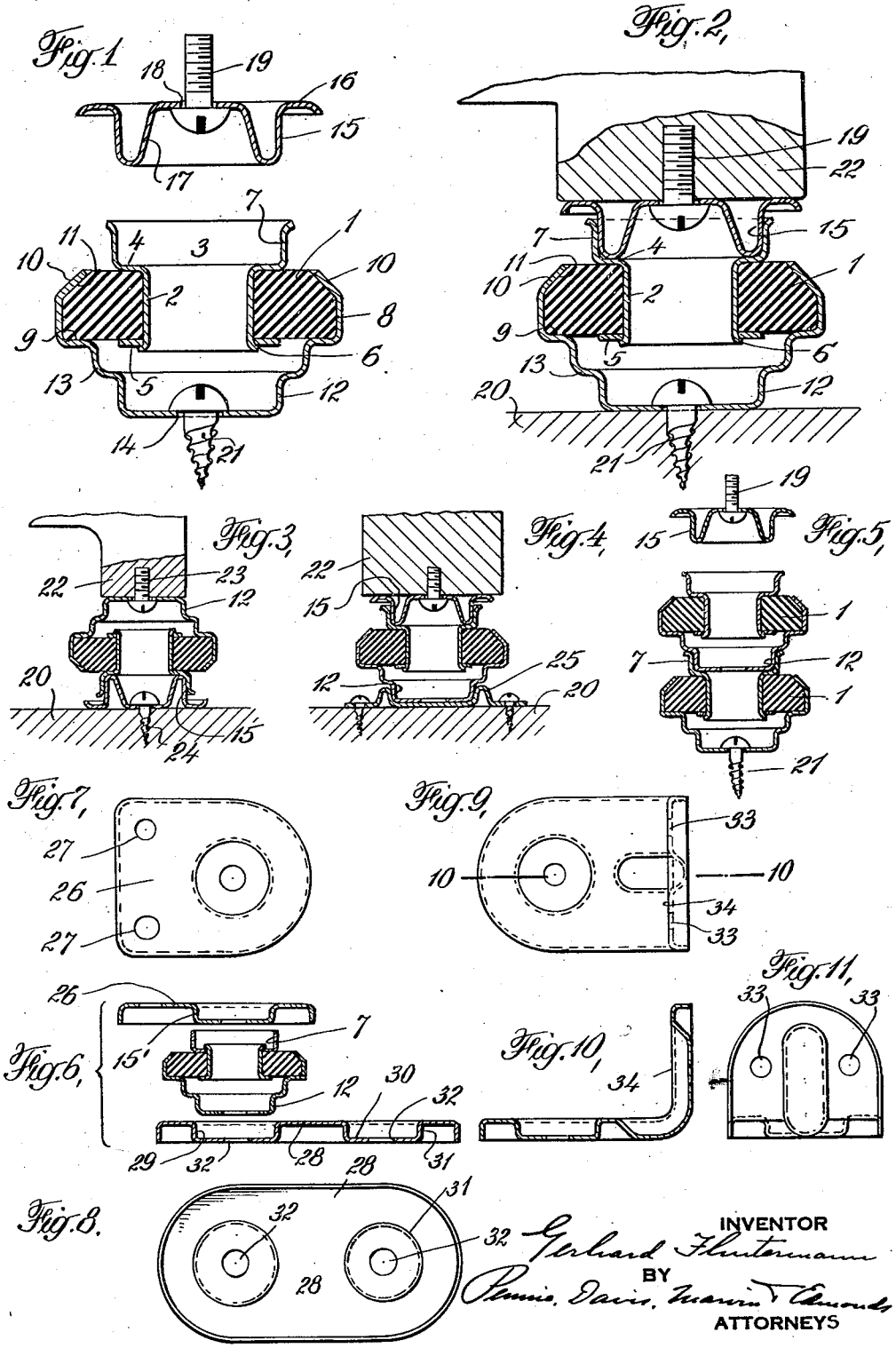

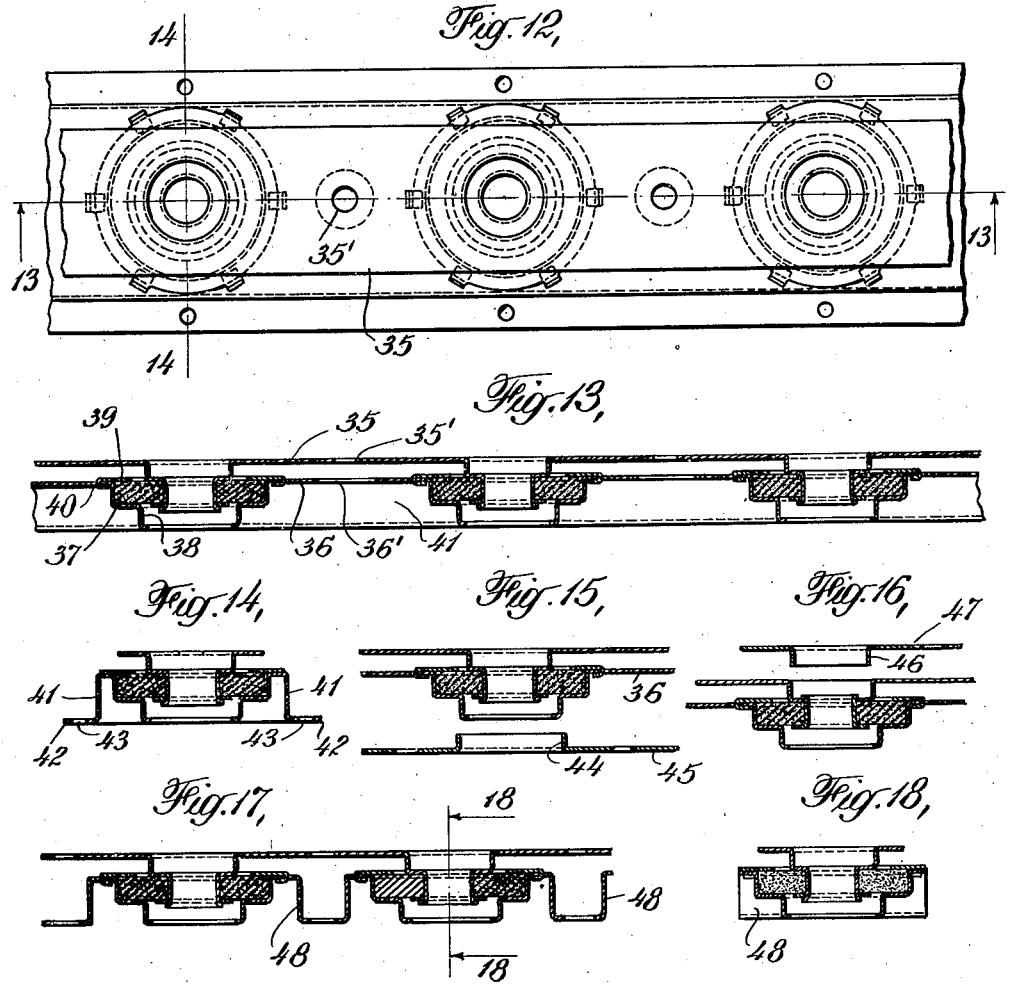

1,834,450

UNITED STATES PATENT OFFICE

GERHARD FLINTERMANN, OF WEST ORANGE, NEW JERSEY

SHOCK-ABSORBING DEVICE

Application filed March 28, 1929. Serial No. 350,468.

This invention relates to devices capable of being imposed between two objects or parts thereof, for absorbing shocks, for deadening the transmission of sounds and for permitting a limited relative movement between the two members while at the same time resiliently opposing such movement.

The principal object of the invention is to provide such a device which is so constructed that it can be manufactured in large numbers at a very low cost and which is so designed that it is capable of many different uses and applications.

The device comprises a body of non-metallic resilient material such as rubber, in the form of a perforated disk. A sheet metal tubular member is inserted into the perforation and clamped to the inner edge portion of the disk, while a second sheet metal member is clamped to the peripheral edge portion of the disk. Both members are designed with a view toward simplicity of construction, cheapness of manufacture, ease of attaching them to the disk of resilient material, and ease of attaching them to the objects in connection with which the device is to be used. The device may be made small enough to serve as a resilient shock-absorbing and sound-deadening support for a typewriter or the like and when made in that size has many other uses. The inner and outer sheet metal members are preferably so formed that one provides a socket and the other a plug so that two or more devices may be superposed by inserting the plug of one into the socket of the other, or the socket on one member may be used in conjunction with a detachable plug adapted to be attached to some object and likewise the plug of the device may be used in connection with a detachable socket adapted to be attached to some object. Further features of construction enable the device to be attached to the object without the use of a detachable plug or socket of the kind just mentioned.

Several forms of the device are disclosed in the accompanying drawings, in which:—

Fig. 1 is a vertical section, on an enlarged scale, of a device constructed in accordance with the invention, this figure also showing a detachable plug member designed for use with the socket of the shock-absorbing device and adapted to be attached to some object;

Fig. 2 shows the parts of Fig. 1 in assembled relation and attached to two objects between which the shock-absorbing device is used.

Fig. 3 corresponds with Fig. 2, but drawn to a smaller scale, and shows the parts of Fig. 2 in inverted relation;

Fig. 4 corresponds with Fig. 2 and illustrates how the plug of the outer sheet metal member may be used in connection with a detachable socket adapted to be attached to an object;

Fig. 5 is a vertical section showing how two or more of the shock-absorbing devices can be superposed and used if desired in connection with a detachable plug member of the kind shown in Fig. 1;

Fig. 6 is a vertical section showing how the shock absorbing device can be used in connection with detachable plug and socket members of modified construction;

Fig. 7 is a plan view of the detachable plug member shown in Fig. 6;

Fig. 8 is a plan view of the detachable socket member shown in Fig. 6;

Fig. 9 is a plan view of a further modified form of detachable plug member;

Fig. 10 is a vertical section taken on the line 10—10 of Fig. 9;

Fig. 11 is an end view of the detachable plug member shown in Fig. 9;

Fig. 12 is a plan view showing how the inner members of a number of shock-absorbing units may be formed from one strip of material while the outer members are likewise formed from one strip of material;

Fig. 13 is a longitudinal section taken on the line 13—13 of Fig. 12;

Fig. 14 is a transverse section taken on the line 14—14 of Fig. 12;

Fig. 15 is a vertical section illustrating how the structure of Figs. 12, 13 and 14 can be used in connection with a detachable socket member;

Fig. 16 is a view similar to Fig. 15 showing how the structure of Figs. 12, 13 and 14 can be used in connection with a detachable plug member;

Fig. 17 is a view corresponding with Fig. 13 and shows how the metal strip out of which the outer members are formed can be crimped in order to bring the shock absorbing units closer together;

Fig. 18 is a transverse section taken on the line 18—18 of Fig. 17;

Fig. 19 is a side elevation showing a modification of the plug and socket on the shock-absorbing device and showing a detachable plug and a detachable socket adapted for use in connection therewith;

Fig. 20 is a plan view of the detachable plug shown in Fig. 19;

Figs. 21, 22, 23, 24 and 25 are vertical sections of modified forms of shock absorbing devices embodying the invention.

The improved shock-absorbing device shown in Fig. 1 comprises a disk 1 of non-metallic resilient material such as rubber. It has a central perforation to receive the neck portion 2 of an inner sheet metal tubular member 3. The inner edge portion of the disk 1 is gripped between a shoulder 4 formed on the sheet metal member 3 and a washer 5 over which the edge portion of the neck 2 is turned as shown at 6. The outer extremity of the sheet metal member 3 is so formed as to provide a socket 7.

The outer edge portion of the disk 1 is gripped by an outer sheet metal member 8. This member has a shoulder 9 so that the outer edge of the disk may be gripped between this shoulder and the inturned edge portion 10. In order that the inturned edge portion 10 need not be turned inwardly to such an extent as to cause crimping or fullness in the metal the corner of the disk 1 is preferably left off so as to provide a bevel 11 into engagement with which the bent edge 10 is pressed. The outer sheet metal member 8 is so formed as to provide a plug 12, whose outside diameter is about equal to the inside diameter of the socket 7. The outer sheet metal member 8 also has a bulge 13 to provide a clearance which permits movement of the inner member without danger of contact between the inner and outer members in normal operation of the device. The end wall of the plug 12 is provided with a perforation 14 for the purpose hereinafter described.

The invention also contemplates a detachable plug member 15, also formed of sheet metal, and of such a size that it may be snugly received by the socket 7 of the shock-absorbing device. The plug 15 has a base portion 16 adapted to rest upon a flat surface of some object in connection with which the shock-absorbing device is used. The central portion of the plug 15 may be depressed as shown at 17 and provided with a perforation 18 to receive a screw, bolt or the like represented at 19.

One way in which the shock-absorbing device illustrated in Fig. 1 may be used is to fasten the plug 12 to one of the objects 20 (Fig. 2) between which the device is to be interposed as by means of a screw 21 inserted through the perforation 14. The central opening in the inner sheet metal member 3 permits a screw driver to be inserted into the device to turn the screw 21. The detachable plug member 15 may be attached, by means of the screw 19, to the other object 22. This method of using the shock-absorbing device may be an advantageous one in connection with typewriters or the like where the object 22 represents one leg of the typewriter and the object 20 represents the typewriter desk. One of the plug members 15 should be attached to each leg of the typewriter and a shock-absorbing device attached to the desk at each corresponding point. The typewriter may be quickly and easily positioned on its shock-absorbing devices and may be easily lifted off of them as the plug members 15 merely rest in the sockets 7 and are readily detachable from them. When the typewriter is in place it is held firmly against sliding movement as the outer members are fastened rigidly to the typewriter desk by means of the screws 21. The disk 1 serves as a resilient bridge between the inner and outer members and permits limited axial movement of the inner member relative to the outer member and at the same time yieldingly opposes this movment. It absorbs the shocks and deadens the transmission of sound from the inner member to the outer member. Unlike most of the shock-absorbing devices now used in connection with typewriters, no part of the rubber or other resilient material rests upon the supporting object 20.

The preferred size of the device is that which adapts it for use in connection with a typewriter so that Figs. 1 and 2 are somewhat exaggerated as to the size of the device but these views were enlarged to more clearly show the details of construction. In Fig. 3 the device is reduced to the actual size which it should have when it is intended for use in connection with a typewriter. In this figure the plug 12 of the outer member is shown attached to the typewriter leg 22 by means of a screw 23 while the detachable plug member 15 is attached to the typewriter desk 20 by means of a screw 24. In other words, the parts shown in Fig. 2 are inverted. In this arrangement when the typewriter is removed from the desk the shock-absorbing devices remain attached to the legs of the typewriter while the plug members 15 remain attached to the desk 20. If desired, the screws 24 may be omitted so that the plug members 15 may slide on the desk 20. While this may not be advisable when the device is used in connection with a typewriter nevertheless it may be advisable when the device is used in other relations. The plug member 15 will then act somewhat in the nature of the small sliding domes now in common use and which are attached to the legs of a chair, desk or the like, to permit them to slide freely and noiselessly upon the floor.

Fig. 4 shows the plug member 15 attached to one of the objects 22 while the other object 20 has a sheet metal socket member 25 secured to it. The socket of the member 25 is of such a size that it snugly receives the plug 12 of the outer sheet metal member. When the shock-absorbing device is used in this way it is entirely detachable from both objects.

Two or more of the shock-absorbing devices may be superposed. This is illustrated in Fig. 5 which shows two of the shock-absorbing devices, the plug 12 of one being inserted into the socket 7 of the other. The plug of the other device may be attached to one of the objects by means of a screw 21 or through the intermediary of a socket of the kind shown at 25 in Fig. 4, while the socket of the other device may be attached to the other object by the use of a plug member 15 and screw 19 as in Fig. 2. When the devices are used in this manner the rubber out of which the disks 1 are made may have the same density or may have different densities to give the composite structure some desirable peculiar action. Or this action may be brought about by making the disk of one device of a different thickness from that of the other device.

Figs. 6, 7 and 8 show detachable plug and socket members of modified construction. The plug member shown in the upper part of Fig. 6, and in Fig. 7, may be formed from a sheet of metal 26 by stamping or drawing, in one portion of it, a projection 15' which forms the plug for cooperation with the socket 7 of the shock-absorbing device. Another part of the metal sheet 26 may be perforated as shown at 27 to enable it to be secured to one of the objects by means of screws or the like. The socket member shown in the lower part of Fig. 6, and in Fig. 8, may comprise a sheet of metal 28 having a depression 29 stamped or drawn in it to form a socket for cooperation with the plug 12 of the shock-absorbing device. The sheet 28 may have a second depression 30 formed in it of a smaller size than the depression 29 so that the plate or sheet 28 may be turned upside down and the projection 31—formed in the act of depressing the metal at 30—may be used as a plug member for cooperation with the socket 7 of the shock-absorbing device. In other words, when the plate 28 is in one position it forms a socket member and when turned upside down it forms a plug member so that it may be used for either of these purposes as occasion requires. The plate 28 may be attached to its object by fastening devices such as screws or the like inserted through perforations 32.

Figs. 9, 10 and 11 illustrate a modification of the plug member shown in Fig. 7. It is designed for use where it is desired to attach it to a surface which is at right angles to the axis of the plug. It is quite similar to the plug member shown in Fig. 7 except that the part of the sheet metal plate which is perforated—as at 33—for the fastening devices, is bent at right angles to that portion of the plate which is provided with the plug as shown at 34.

Figs. 12, 13 and 14 show a number of inner members formed integrally with a plate or strip 35. A second plate or strip 36 has a number of outer members associated with it. Each inner member may be clamped to a disk of rubber or other resilient material as before. The outer members may be formed by providing the strip 36 with one set of depressions 37 forming seats for the disks of resilient material and a second set of smaller depressions 38 which form clearances for the axial movement of the inner members and also form plugs similar to the ones shown in the preceding figures. Each disk is held in place in its depression 37 by means of a sheet metal annulus 39 which partly overlaps the outer edge portion of the disk of resilient material and which is provided with a series of prongs 40 inserted through corresponding perforations in the strip 36 and then crimped over to lock them to this strip. The outer edges of the strip 36 may be bent downwardly as shown at 41 in Fig. 14 and then horizontally as shown at 42. The horizontal portions 42 may have perforations 43 to enable the strip 36 to be fastened directly to one of the objects by means of screws or the like should this be desired. The other strip 35 may have perforations 35' which enable it to be attached directly to the other object by means of screws or the like. In order that the perforations 35' may be accessible the strip 36 is provided with adjacent larger perforations 36'. The perforations 36' enable screws or other fastening devices to be inserted through them and then into the perforations 35' of the strip 35. The plug portions of the sheet metal strip 36 may be used in connection with sockets 44 formed in a sheet metal strip 45 adapted to be attached to one of the objects as shown in Fig. 15, and the sockets of the strip 35 may be used in connection with plugs 46 formed on a sheet of metal 47 adapted to be fastened to one of the objects as shown in Fig. 16.

On account of the amount of drawing that is necessary to form each set of depressions 37 and 38 in the strip 36 these depressions cannot be formed too near the adjoining set of corresponding depressions. If it is desired to have the disks of rubber close together in the final product the strip 36 may be crimped or corrugated as shown at 48 in Figs. 17 and 18 after the depressions are formed in it and this will have the effect of shortening the distance between the disks in the finished article. The strips 35 and 36 may be as wide as necessary when the drawing or stamping operations are performed on them and then the strips may be subsequently shaped and trimmed to the proper width. The forms of the device shown in Figs. 12 to 18 inclusive may be used wherever it is desired to use a number of resilient disks and where the conditions do not require the use of separate and individual devices of the kind shown in the other figures.

In Figs. 19 and 20 the socket part 7' of the shock-absorbing device is provided with a plurality of bayonet slots, one of which is shown at 49, to receive projections 50 formed on the detachable plug member 15". The plug portion of the shock-absorbing device may be threaded as shown in 51 to cooperate with corresponding threads 52 formed in the detachable socket member 25'. Figs. 19 and 20 are intended to show the various modifications that are possible in the construction of the plug and socket on the shock-absorbing device and in the construction of the detachable plug and detachable socket.

The device shown in Fig. 21 is similar to that shown in Fig. 1 except that between the shoulder 4 and the vertical wall of the socket there is an inclined portion 53. In the operation of the device during axial downward movement of the inner member more and more of the inclined portion 53 comes in contact with the resilient material 1 and this serves to gradually increase the opposition to the movement. The relation between the parts is preferably such that after a part of the inclined surface 53 has come in contact with the resilient material 1 further axial movement of the inner member will tend to compress the resilient material. This is accomplished by having the outer diameter of the inclined shoulder 53 greater than the inner diameter of the shoulder 9 so that they partly overlap. When the overlapping portions of the shoulders are effective it is obvious that the resilient material between them will be compressed.

In Fig. 22 this same result is accomplished by inserting between the shoulder 4 of the inner member and the resilient material 1 a washer or disk 54 which is slightly conical in shape so that its outer edge is spaced away from the resilient material. As the inner member moves downwardly, more and more of the surface of the disk 54 will come in contact with the resilient material 1.

The main difference between the device shown in Fig. 23 and the devices of the other figures is that the body of the resilient material is formed by several superposed disks. In Fig. 23 two of such disks are shown—one at 1' and the other at 1". The inner member 3 clamps the inner edge portion of both disks and the outer member 8' clamps the outer edge portion of both disks. A thimble 55 fits over the end of the neck on the inner member 3 and has a horizontal flange portion 56 which lies between the two disks 1' and 1". The lower edge of the thimble 56 may have a small flange 57 which is clamped between the washer 5 and the turned over edge 6 of the inner tubular member. In this way the inner tubular member is not only clamped to the composite body of resilient material but it is also clamped to the thimble 55. In this type of device when the inner member moves downwardly relative to the outer member a bending action takes place in the upper disk 1', as in the figures previously described, while the downward movement of the flange 56 causes a compression to take place in the disk 1". If the inner member 3 moves upwardly relative to the outer member, the movement of the flange 56 causes a compression in the disk 1' while the bending action takes place in disk 1". Of course the bending action in the disks may also cause some compression of the material in certain parts of the disks. The bending action is, therefore, supplemented by a compressing action which may be made as great or little as desired to give the device the desired action by properly designing the parts. The lower disk 1" preferably has openings 58 which permit the rubber to flow when this disk is placed under compression. The corners of the disks may be rounded at 59 to provide a clearance into which the rubber may flow when the disks are compressed. By properly shaping the outer sheet metal member additional clearances may be provided to allow the rubber to flow as shown at 60 and 61. This device may be made to function in a special way by making one disk thicker than the other as shown in the drawings, or by making them out of rubber of different densities. Under these circumstances when the device is in one position its action will be somewhat different from its action when turned upside down.

In all of the figures so far described the inner member may be attached to one of the objects by the use of a detachable plug member, but if desired the inner member may be shaped as shown in Fig. 24 to receive the head of a screw or the like 62. In this case the plug portion of the outer sheet metal member preferably houses a nut 63 having a threaded central opening adapted to receive a screw 64. This type of device may be attached to the object by first inserting a screw driver through the opening of the nut 63 and turning the screw 62 to attach the inner member to one of the objects 65, after which the screw 64 may be inserted through the other object 66 and screwed into the nut 63.

In Fig. 25 the inner member is shaped to receive a nut 67 preferably formed out of sheet metal. This nut forms a part of the fastening means for attaching the inner member to one of the objects.

A feature common to all of the devices shown in the drawings, including those shown in Figs. 24 and 25, is that at least one of the members is shaped to form a cup to receive a portion of the attaching means for that member. The portion of the attaching means thus received by the cup is permanently retained by the cup in the case of Figs. 24 and 25 but in the other figures it is in the nature of a plug which is detachable from the corresponding cup or socket of the shock-absorbing device.

While the drawings show the inner and outer sheet metal members clamped to the body of resilient material in a manner which I believe to be very simple and highly efficient, nevertheless they may be clamped to the resilient material in other ways.

It will now be seen that the device is extremely simple in construction. Most of the metallic parts are pressed or drawn from sheet metal thus enabling the device to be sold at very low cost. It is so constructed that it may be attached to various objects in a number of different ways thus making it capable of many different uses. While it may be made in any desired size I prefer to make it about the size of a half dollar thus making the cost low and making it serviceable for use in connection with such objects as typewriters, motors, radio sets and loudspeakers and any other object where it is desired to absorb shocks or vibrations or to deaden the transmission of sounds, or to resiliently permit a slight relative movement between the parts. As many of the devices may be used in conjunction with one object as may be necessary to bring about the desired action.

I claim:

1. A resilient device adapted to be interposed between two objects, comprising a perforated disk of non-metallic resilient material, a sheet metal member clamped to the inner edge portion of said disk, an outer sheet metal member having a part clamped to the outer edge portion of the disk and having no part in contact with the inner edge portion of the disk whereby relative movement between the inner and outer portions of the disk in an axial direction is permitted and means for attaching said members to said objects comprising a plug member adapted to be secured to one of the objects, one of said members being shaped to form a socket for the reception of the plug of said plug member.

2. A resilient device adapted to be interposed between two objects, comprising a perforated disk of non-metallic resilient material, a sheet metal member clamped to the inner edge portion of said disk, an outer sheet metal member clamped to the outer edge portion of the disk, the outer member being shaped to form a plug and the inner member being shaped to form a socket, said outer member being perforated to receive a screw or the like by means of which the outer member may be attached to one of the objects and the inner member being tubular to permit the insertion therethrough of a tool to turn said screw.

3. A resilient device adapted to be interposed between two objects, comprising a perforated disk of non-metallic resilient material, a sheet metal member clamped to the inner edge portion of said disk, an outer sheet metal member clamped to the outer edge portion of the disk, one of said members being shaped to form a socket and the other member being shaped to form a plug, the outside diameter of the plug being approximately the same as the inside diameter of the socket, whereby two or more of the devices may be superposed by inserting the plug of one device into the socket of the other.

4. A resilient device adapted to be interposed between two objects, comprising a perforated disk of non-metallic resilient material, a sheet metal member clamped to the outer peripheral portion of the disk, a sheet metal member having a tubular portion extending into the opening of the disk and clamped to the inner edge portion of the disk, said inner sheet metal member extending beyond one side of the disk and there shaped to form a socket, and a sheet metal plug member adapted to be attached to one of the objects and having a portion shaped to form a plug adapted to be received by said socket, said first named sheet metal member having no part in contact with the inner edge portion of the disk whereby relative movement between the inner and outer portions of the disk in an axial direction is permitted.

5. A resilient device adapted to be interposed between two objects, comprising a perforated disk of non-metallic resilient material, a sheet metal member clamped to the outer peripheral portion of the disk, a sheet metal member having a tubular portion extending into the opening of the disk and clamped to the inner edge portion of the disk, said inner sheet metal member extending beyond one side of the disk and there shaped to form a socket, and a sheet metal plug member having a portion shaped to form a plug adapted to be received by said socket and also having a flat portion serving as a base which enables the plug member to slide on the surface of one of said objects.

In testimony whereof I affix my signature.

GERHARD FLINTERMANN.